May 9, 1944.  C. B. DUSHANE, JR  2,348,247
HEATER OR COOLER FOR OIL FILTERS
Filed Oct. 14, 1940
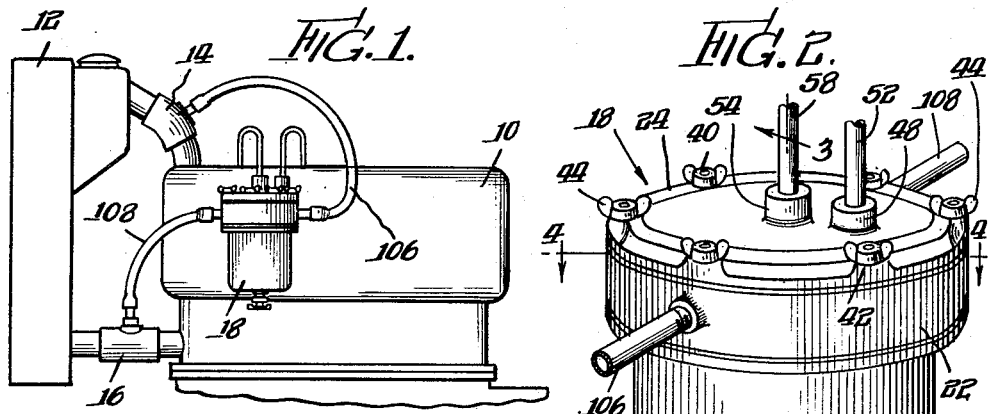
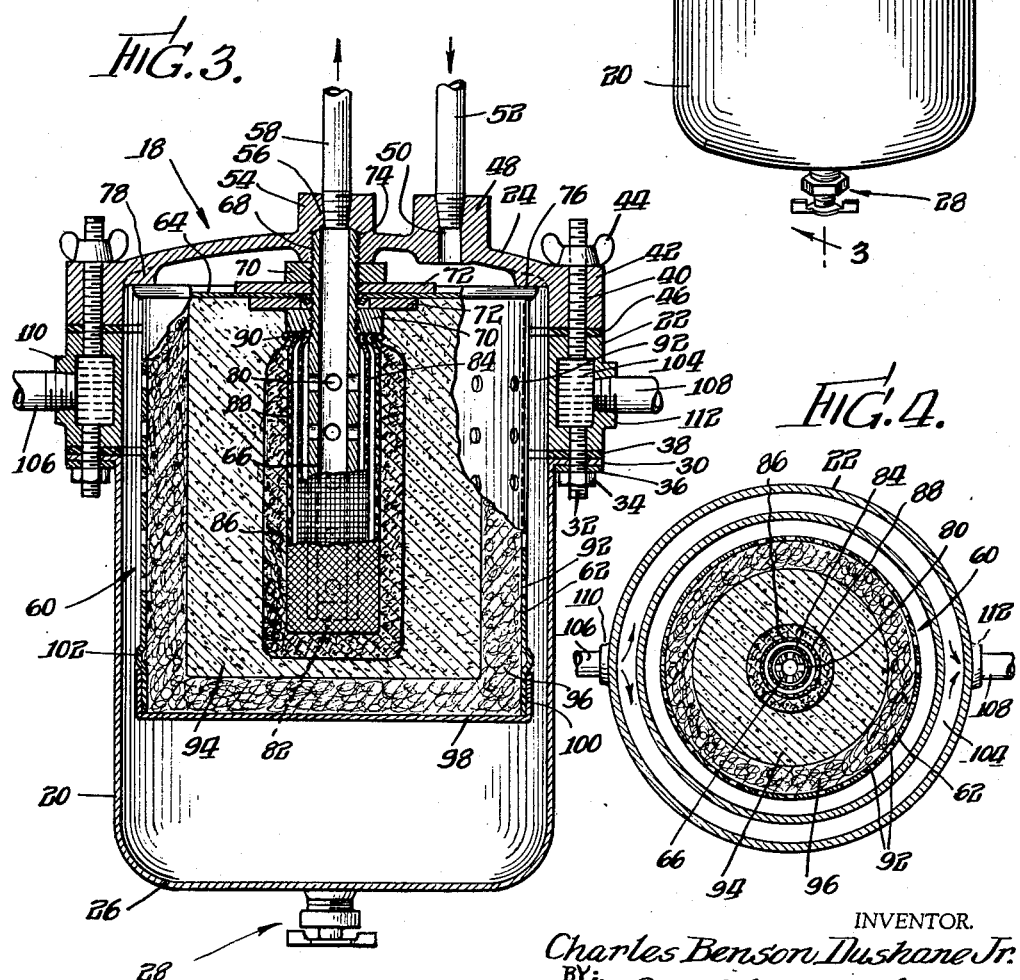
INVENTOR.
Charles Benson Dushane Jr.
BY: Cox Moore & Olson
attys Patented May 9, 1944

2,348,247

UNITED STATES PATENT OFFICE 2,348,247

HEATER OR COOLER FOR OIL FILTERS

Charles Benson Dushane, Jr., Chicago, Ill.

Application October 14, 1940, Serial No. 361,076

2 Claims. (Cl. 210—122.5)

This invention relates to an oil filter. More particularly, it relates to a filter for use in conjunction with an internal combustion engine or the like, for clarifying and purifying oil employed in such engine as, for example, a lubricating medium or a fuel.

Oil filters for clarifying and purifying the oil employed in the lubricating system of internal combustion engines are and have been in extensive use for a long time. They are constantly being improved, however, although in some instances these improvements intensify old difficulties or introduce new ones. For example, it has been found that in oil filters, particularly those in which a considerable body of oil is maintained at all times, some difficulty is encountered in getting a satisfactory flow of the oil at low temperature, especially where the oil passes through the small interstices of a filtering material under a minimum of pressure. This is true whether the oil is a lubricant or a fuel.

Although, in the case of lubricating oils, improvements are constantly being made, a cheap lubricating oil, which will satisfactorily lubricate any internal combustion engine and will also flow under any temperature conditions ordinarily encountered where such engines are used, has not been produced to date. The difficulty of getting satisfactory flow increases with the difference between the extremes of temperature encountered in the locality and also with the character of the engine to be lubricated. Thus, a heavier lubricating oil, which is required for heavy or loosely operating motors, will not flow as readily as the light oils at very low temperatures. From this it is apparent that the difficulty in getting satisfactory flow is encountered largely under conditions where good lubrication is most necessary.

A good lubricating system should be arranged to provide a maximum supply of lubricant at all times, and therefore it is a decided disadvantage in an oil filter to have the oil reach a state where it will not flow satisfactorily. Furthermore, it is undesirable to have a body of oil in a lubrication system reach too high a temperature because of the resulting loss of lubricating qualities.

It is therefore an object of this invention to provide an oil filter having improved characteristics with respect to the extent to which flow of oil therethrough is impeded under any conditions of operation, including even the most adverse.

Another object is to provide an oil filter in which means are provided for decreasing the tendency of the oil to be impeded in its flow therethrough.

A further object is to provide an oil filter comprising means for controlling the temperature of the oil in the filter.

A more specific object is to provide means for heating the oil in an oil filter whereby it may be brought to a temperature where it will flow, although atmospheric temperature is well below the pour point of the oil.

A still further object is to provide an improved oil filter in which oil is filtered through small interstices of a filtering medium under a low pressure, and in which means are provided for promoting the flow of the oil through the filter.

Still another object is to provide an oil filter in which the means for promoting flow are particularly adapted to increase the flowability of the oil when atmospheric temperature drops below the pour point of the oil.

An additional object is to provide means for heating the oil in an oil filter with the hot water from the cooling system of an internal combustion engine in connection with which the oil filter is used.

Another object is to combine an oil filter with an internal combustion engine so that they cooperate in a new way to provide better lubrication of the engine.

Still another object is to provide such means for heating an oil filter in which a body of oil is maintained at a substantially static level and in which the oil flows, for example, in a generally horizontal direction through a bed of relatively loose filtering material, or upwardly through a matted filtering material.

Numerous other objects will appear hereinafter, some of which will become more apparent from a consideration of the accompanying drawing, in which Figure 1 is a side elevation of some of the more important parts of an internal combustion engine together with a filter made in accordance with the present invention;

Figure 2 is a view in perspective of a filter made in accordance with the present invention;

Figure 3 is a sectional view taken on the line 3—3 in Figure 2; and

Figure 4 is a sectional view taken on the line 4—4 of Figure 2.

Referring first to Figure 1, it is seen that a cylinder block and head 10 is shown, having associated with it a radiator 12. A hose 14 conducts hot water from the cooling system to the radiator, from which it returns again to the cooling system in the cylinder 10 through a hose 16. The oil filter 18 is shown located adjacent the upper portion of the cylinder for convenience, and it will be understood that it may be located in any other desired place, although it will be apparent that it is preferable to position it near the warmer parts of the engine in order to further improve the flow of oil therethrough.

As can best be seen by reference to Figures 2 and 3, the filter 18 is provided with an outer casing which is generally cylindrical in shape and includes a lower portion 20, a jacket portion 22, and a cap 24. Centrally located in the bottom wall 26 of the casing portion 20 is a plug 28 through which sediment collecting in the bottom portion of the filter may be drawn off. Portion 20 terminates at its upper edge in an annular flange 30 upon which the jacket member 22 rests. A plurality of machine screws 32 mounted in the jacket 22 pass through apertures in the flange 30.

Nuts 34 and washers 36 are threaded onto these machine screws and are drawn up tight against the flange 30 to firmly bolt the parts together. A suitable gasket 38 of cork or of oil resistant synthetic rubber-like material such as neoprene or butadiene polymer, or other equivalent material, serves to tightly seal the joint. The cover portion 24 is in turn secured on top of the jacket portion 22 by machine screws 40 mounted on the upper side of the jacket 22 and passing through suitable apertures in the annular flange 42 on the cover 24. Wing-nuts 44 threaded onto machine screws 40 serve to held the cover 24 in place and to, at the same time, permit its ready removal. A gasket 46, similar to gasket 38, is also positioned between the jacket 22 and the cover 24.

A little to one side of the center the cover 24 is provided with a circular, thickened portion 48 having a central opening 50 passing vertically therethrough. This opening 50 is threaded at its upper end to receive an inlet pipe 52, the other end of which is connected to a source of oil to be filtered (not shown). In the center of the cover 24 another circular, thickened portion 54 is provided which also has a central opening 56 therethrough. An outlet pipe 58 communicating with the place to which the filtered oil is to be supplied (not shown) is threaded in the upper end of opening 56.

Interiorly of the casing the filter is provided with filtering or clarifying means, such as a body of filtering material, or a filter cartridge containing the actual filter bed which preferably is so constructed and arranged as to permit ready removal and replacement at any time when the clarifying power of the filter becomes weakened or exhausted. Such a cartridge comprises a metal can 60 having a cylindrical wall 62 and a top wall 64 which is punched at its central portion to provide a circular aperture for accommodating a central tube 66 which forms a well for the purpose of collecting and conveying off the filtered and clarified oil.

The tube 66 serves further to support the can 60 and its contents, to be hereinafter described, with respect to the remainder of the filter. The tube 66 is threaded adjacent its upper end 68 to receive a pair of opposed nuts 70, one situated on either side of the top 64 of the can for rigidly clamping the said top therebetween. Large washers 72 serve to distribute the force and render the support extremely rigid.

The extreme upper portion of the threaded end 68 of the tube 66, extending above the nut and washer assembly 70 and 72, is received in the enlarged and threaded lower portion 74 of the opening 56 through the circular, thickened portion 54 in the center of cover 24. The upper edge of the side 62 of can 60 is provided with a bead 76 which secures the cover 64 in place with respect to the side 62 and which is adapted to be drawn up against four shoulders 78 equally spaced around the perimeter of the generally dome-shaped portion of the cover 24.

This construction, as can be seen, makes it possible to have the can 60 rigidly held within the filter 18, by reason of the fact that the bead 76 is drawn up against the shoulder 78, and at the same time to have an arrangement where the filter cartridge can be readily removed with the cover simply by removing the wing-nuts 44 and lifting the cover and can assembly out. The cartridge can then be readily disassembled from the cover 24 simply by rotating the cartridge to unscrew the upper end 68 of the tube 66 from the cover 24.

The wall of the tube 66 is, throughout the lower portion of its length, as viewed in Figure 3, provided with a plurality of apertures 80, and the lower end thereof is preferably sealed off by a plug 82 of any suitable material, such as metal or wood, for example. The portion of the tube 66 extending into the interior of the can 60 is completely surrounded by a sleeve 84 of screening material which includes a circular bottom portion extending beneath the lower end of the tube 66. In the preferred embodiment a 100-mesh copper or bronze screen is employed, although it will be apparent that substantially any non-reactive screening material may be used, while the size of the apertures may vary within wide ranges. According to one method of mounting the sleeve 84 in position it is soldered to tube 66.

Exteriorly of the sleeve 84 is a second sleeve 88 similar in form to the sleeve 84 and surrounding it and formed of a suitable textile material. Each of the sleeves 84 and 88 has slightly larger dimensions than the tube or sleeve contained within it so that small space is left between the various parts. In turn, surrounding the sleeve 88 is a third sleeve 86 formed from a mat of fibrous material, preferably jute. Preferably, this mat is in the neighborhood of a quarter of an inch thick. The jute sleeve 86 and the textile sleeve 88 are both secured in place by a loop of cord 90 tensioned about their open ends.

The sleeves 86 and 88 prevent the material of the filter bed from passing into the tube 66 with the oil and produce a final separation of the oil which is being filtered from impurities or material of the filter bed. Various textile fabrics have been used to form the screen 88 but immensely superior results have been secured with hard cotton fabrics, such as cretonne. It is believed that these superior results are due to the hardness and cleanness of the fibers. Thus, for example, various other fibers are characterized by a relatively soft surface having a multitude of fine hairs which it is believed tend to cause a clogging action. In employing cretonne in the present structure, however, the oil readily passes through the material, while there is no tendency for the material from the filter bed to accumulate and pack against the surface of the fabric. In the present structure the filter bed is maintained loose adjacent the textile sleeve 88 with the result that the oil is free also to run downwardly along the inner and outer surfaces thereof to produce a washing action and keep the surfaces clear. The sleeve 86 is preferably formed from jute, such as is commonly employed for sealing sewer pipe joints, although other materials have been used. Jute is preferred since it has been found to be superior to other materials tested in the completeness of the separation which it produces.

The cylindrical wall 62 of the cartridge 60 is provided with a multitude of small apertures 92. These apertures are spaced from the bottom and top of the cartridge 60 a relatively great distance to prevent the formation of channels adjacent these portions of the device.

Interiorly of the cartridge 60 a body of pulverulent filtering material 94 is provided. This entire bed of material 94 is made up of discrete individual particles of a suitable adsorbent material which will remove the impurities and properly clarify the oil handled by the filter. It is preferred that the filter bed 94 comprise mainly an adsorbent earth, such as fuller's earth, including particles which will pass a 30-mesh screen and are retained by a 60-mesh screen. The particle sizes may vary over a greater range than that specified, if desired, but too small particles tend to flow with the oil being filtered, and too large particles tend to decrease the effectiveness of the filter.

In addition to the adsorbent earth, a proportion of some suitable water-absorbing or adsorbing particulate material is also included in the bed 94. This material is provided to remove aqueous components, together with acids or other reagents, which are generally associated with or soluble in water. Suitable materials for this purpose include silica gel and granular, activated alumina. With respect to this material, the size of the particles may vary within a somewhat wider range, the preferred range being that the alumina particles be retained upon a 60-mesh screen and pass a 20-mesh screen. Although the water absorbent or adsorbent material comprises only a small proportion of the whole bed 94, the relative amounts of earth and water removing material may vary somewhat. Very satisfactory results have been obtained with an intimate mixture of 30 parts of the above described fuller's earth and 3 parts of the activated alumina.

In order to completely and uniformly distribute the incoming oil to the filter bed, as well as remove the coarser particles, there is provided a fibrous layer 96 extending adjacent the side wall 62 and interiorly of the cartridge 60. The layer 96 may comprise, for example, a high-grade cotton waste free from balls of matted material or lint, and particularly from imperfections such as rags and foreign materials, as may be found of a matted wood material sold under the trade-name "Fir-Tex." In other words, this layer should consist of fibers as pure and uncontaminated as possible and must be firmly pressed in place in order to provide a uniform, oil-distributing layer. The layer 96 likewise preferably extends across the bottom of the mass of filtering material 94 for reasons which will appear hereinafter.

In loading the cartridge 60 it is inverted from the position shown in Figure 3 after the central tube 66 together with the screen 84 and the textile sleeve 88 have been completely assembled and a removable tube (not shown) having a diameter substantially equal to that indicated by the line of demarcation between the body of particulate material 94 and the layer of waste 96 is inserted into the cartridge 60. The waste is then pushed in around the removable tube and packed uniformly thereabout. The removable tube is thereupon lifted out and the thoroughly mixed and graded particles forming the filter bed 94 are inserted and uniformly packed to assure a homogeneous distribution of particles. When the body of material 94 is completely loaded the portion of the layer of fibrous material 96 extending across the bottom of the mass of filtering material 94 may be placed in position. The entire unit 60 is maintained in assembled relationship by the metal cover 98 which has an annular, upwardly projecting flange 100 which tightly engages about the lower edge of the wall 62 and rests against an annular projection 102 spaced inwardly from the lower edge of the wall 62. In a preferred modification of the invention the layer of fibrous material 96 is about half an inch thick.

As pointed out in the copending application of Obe Wilton Carman and Donald Wilmer Hayden, Serial No. 164,515, filed September 18, 1937, in which the filter cartridge is broadly described, it is desirable to pack the layers 94 and 96 tightly at the time the cartridge 60 is made, with a view to avoiding any tendency they may have to change shape in use due to jarring. In this packing, however, it is necessary to avoid anything which would tend to destroy the particulate and relatively loose character of the material, as pointed out in the copending application.

As pointed out above, when the device is in use the filter 18 contains a considerable body of oil. In cold weather, particularly where the engine has been standing idle for some time and/or where a very heavy oil is used, this oil becomes quite cold and frequently its temperature decreases below the pour point of the oil or to a point where the oil becomes so stiff that it will not flow through the filter. Of course, particularly where the filter is located adjacent a warm portion of the engine, it may eventually be heated up somewhat by radiation from the engine, but it has been found that this means cannot be relied upon if satisfactory lubrication is to be obtained. Accordingly, the jacket member 22 is provided. This jacket member takes the form of a ring provided with a circular conduit 104. This conduit 104 communicates preferably in diametrically opposite points with an inlet pipe 106 and an outlet pipe 108, which pipes are respectively threaded into enlarged portions 110 and 112 formed on the sides of the jacket 22.

As can be seen by reference to Figure 1, the inlet pipe 106 communicates with the hose connection 14 adjacent the outlet from the cylinder 10 where the cooling medium, usually water, is warmest. It will be understood that this connection may be made at other points in the cooling system where warm water can be drawn off; preferably it is made between the cylinder outlet and the thermostat, if one is employed. The outlet pipe communicates with the return 16 from the radiator 12 so that the water or other medium, after passing through the jacket 22, returns again to the cooling system in the cylinder block 10. Means are thus provided for very rapidly bringing the oil in filter 18 up to a temperature at which it will flow satisfactorily through the filter.

As is well known, the water in the cooling system of an internal combustion engine heats up very rapidly when the engine is in operation, and the lag between the time of starting the motor and the time when the water flowing through the conduit 104 will be sufficiently warm to cause the oil to flow under any conditions normally encountered where internal combustion engines are used is so short that the delay is not great enough to cause any appreciable difficulty due to insufficient lubrication during this period. On the other hand, it is much more rapid than any method heretofore known and in operation is highly satisfactory. It has utility not only under conditions where the oil will not flow at all but also under conditions where its rate of flow is decreased due to viscosity increases resulting from lower temperature.

Where the oil filter 18 is provided with a jacket 22, even in very cold weather, the oil is quickly brought up to temperature so that the incoming oil entering through pipe 52 may pass thence downwardly around the cartridge 60 into the body of oil surrounding the cartridge and filling the lower portion 20 of the filter. In this connection, it will be noted that the cartridge is spaced a relatively great distance from the bottom wall 26 of the casing in order to provide a space for the accumulation of settlings which may be removed through the plug 28. From this body of oil surrounding the cartridge 60 a portion passes into the cartridge through the openings 92.

As pointed out in the copending application referred to above, the filtering action is completely uniform and the cartridge is supplied by oil at an equal pressure in all directions, free from currents due to the feed conduit. The oil passing through the apertures 92 then moves in a generally horizontal direction through the waste 96 and the bed 94, from which it passes through the fiber sleeve 86, the textile sleeve 88, and the screen 84, and enters the tube 66 through the apertures 80. From this tube it passes outwardly through pipe 58.

It will be apparent that the heating of the oil through the agency of a hot cooling medium of the motor block circulating in the jacket member 22 is extremely simple and effective. Heat from the motor which would otherwise be wasted through dissipation in the radiator is utilized to advantage. The heating means is simple in its operation, including parts which should have a long life. Moreover, the jacket member 22 can be attached to an oil filter with a minimum of change in structure of the oil filter.

The utility of the jacket has been particularly stressed with respect to very low temperatures. Its utility is not so limited, however. To the contrary, since viscosity of oil generally decreases with increase in temperature, and since the lower the viscosity of the oil, the more satisfactory the filtering operation will be, particularly in a filter of the type described herein, the jacket has utility over a wide range of temperatures, serving to increase the temperature of the oil being filtered over what it would be without the jacket.

More particularly, it will be apparent that a viscous oil will have much more tendency to retain in it the material to be filtered out than will a less viscous oil. Also, since it is an important feature of the filter cartridge described that the oil pass through the filter with a minimum of pressure drop, low viscosity is highly desirable since the rate of passage with a given pressure drop increases with decrease in viscosity.

Although the above description is specifically concerned with the application of the invention to the heating of a filter for oil in an internal combustion engine in which filter a particular filtering cartridge is employed, the invention is not so limited. Thus, the jacket heating means or other source of heat may be applied to oil filters generally, including other types of filtering means, such as a cake of wood fiber made from the wood of fir trees and sold under the trade name "Fir-Tex." Moreover, the filter need not be adapted only for use in the lubrication system of internal combustion engines. It may, on the contrary, be applied to the filtering of oil generally, another use being, for example, the filtering of fuel oil supplied to a Diesel engine. A special advantage exists in such a use since it is desirable to heat such oil for the general purpose of raising its temperature without regard to the resulting decrease in viscosity. Although special advantages flow, as pointed out above, from the use of the liquid cooling medium from the cooling system of an internal combustion engine as the medium circulated in the jacket 22, other sources of liquid heating medium may be employed. Also, the jacket member may, under certain circumstances, be employed to cool the oil in the filter particularly where the oil temperature for any reason reaches an excessively high point. The desirability of high oil temperature as a means for decreasing viscosity has been stressed herein but it is recognized that there is an upper limit of temperature above which it is undesirable to maintain the oil for any substantial period of time for the reason that such temperatures tend to destroy the lubricating properties of the oil.

Thus, experience indicates that the optimum temperature range for the filtration of oil is from about 160° F. to about 200° F., although higher and lower temperatures may be used. The fact that the preferred range lies below the boiling point of water indicates the advantage of the use of this medium as the medium for circulation in jacket member 22. Furthermore, the fact that the normal temperature maintained in the cooling medium of an internal combustion engine in operation falls within the range described makes the combination of the novel filter with an internal combustion engine as described hereinafter an ideal one.

The above uses flow from the fact that in the novel filter described herein a liquid medium is circulated in a jacket, in heat exchange relation with the oil in an oil filter. Whether or not the oil is heated or cooled will, of course, depend upon the relative temperatures of the oil and the circulating medium. Thus the jacket serves broadly as a temperature control means for the oil in the filter. Other uses of the novel filter will be apparent to those skilled in the art.

Little or nothing has been said regarding the method of supporting the filter 18 since it can be supported in any desired manner. One such means includes a bracket attached to the casing, and another involves the use of a strap passing around the wall 20 and suitably supported on the motor block or on some other part of the engine mounting where the filter is used in connection with an internal combustion engine. There is, of course, an advantage in supporting the filter through the casing portion 20 since the assembly then becomes permanent in nature, because in renewing the filter it is only necessary to lift off the top 24 and the filter cartridge which is attached thereto comes off with it.

In addition to what has been set forth above, it may be pointed out, in regard to materials of construction, that the lower portion of the casing 20, the can 62, the lid 98, and the top 64 of the can may be conveniently formed from sheet-metal pressed into shape where necessary and apertured as described. It has been found, on the other hand, that the jacket portion 22 and the cap 24 can be conveniently formed by casting from aluminum or an aluminum alloy, or from iron or other metallic materials which lend themselves readily to casting. The invention is not limited to any particular materials of construction, however.

The use of the liquid cooling medium from the motor as a source of heat for the filter is particularly advantageous by reason of the fact that any danger of overheating the oil is thereby avoided. The maximum temperature to which the cooling medium ordinarily employed in an internal combustion engine can rise is well below the upper limit of temperature to which the oil can be safely heated. On the other hand, if, for example, heat from the exhaust were to be employed, there would always be the danger that the temperature of the oil in the filter might be increased above a safe limit. In addition, such excessive heating of the oil would tend to destroy its lubricating quality at too rapid a rate.

By reason of the peculiar adaptability of the cooling medium in an internal combustion engine as a source of heat for the oil filter, the filter and the motor cooperate in a manner not heretofore known. Thus, the filter supplies clean lubricating oil to the motor and the motor in turn supplies heating medium to the filter. Furthermore, the filter supplements the action of the radiator in extracting heat from the liquid cooling medium. The heat from the motor, which is normally wasted by dissipation into the air, is caused by reason of the cooperation between the filter and the engine body to improve the lubrication of the moving parts in the motor and to make possible the use of a more efficient filter for this purpose.

It will be apparent that many widely different embodiments of this invention may be made without departing from the spirit and scope thereof, and therefore it is not intended to be limited except as indicated in the appended claims.

The invention is hereby claimed as follows:

1. In a device of the class described, in combination with a relatively deep sheet metal shell having a flange at its upper end, a ring-like water jacket adapted to rest upon said flange, a head adapted to rest upon the upper portion of said water jacket, means for maintaining said water jacket and said head in assembled relation, said head having a concentrically disposed opening, means associated therewith for mounting a clarifier centrally of and within said shell, said clarifier depending into said shell but terminating substantially short of the bottom of said shell to provide a sludge chamber, means formed in the upper portion of said head for introducing unclarified lubricant into said head, said clarifier having openings through which said unclarified liquid is adapted to flow into said clarifier, and said clarifier having a concentrically disposed discharge outlet connected with said first mentioned centrally disposed opening for the discharge of the clarified lubricant, and said water jacket having entrance and exit means for flowing heated fluid therethrough from the water jacket of an internal combustion engine whereby to maintain a uniform heating effect upon the lubricant as it passes through the clarifier.

2. In a lubricant filter adapted to be connected to the lubricating system of an internal combustion engine having a water cooling system, said filter including a relatively deep enclosing shell, a water jacket connected with the upper portion of said shell, said water jacket having a water inlet and water outlet adapted to be connected with the cooling system of the engine, a shell closure connecting with the upper portion of said jacket, fastening means for maintaining said shell jacket and shell closure in assembled relation, said shell closure having an oil inlet for connection to said lubricating system and a centrally disposed oil outlet for connection to said lubricating system, a filter cartridge including an enclosing cartridge casing disposed within said shell, said casing having an imperforate bottom, and having vertical side walls, the intermediate portions of which side walls are perforate, a cartridge closure for the top of said cartridge casing, the underside of said shell closure having means forming a seat for said cartridge closure and having oil passages connecting the space between said closures with the space between the vertical wall of said shell and cartridge casing, means forming a centrally disposed conduit extending into said cartridge, that portion of the conduit within the cartridge having a vertical series of perforations, the upper portion of said conduit having means forming fluid-tight connection with the centrally disposed oil outlet of said closure, there being means for clamping said cartridge and its closure against the underside of said shell closure whereby to hold the cartridge centrally of said shell with the vertical walls of said cartridge spaced from the vertical walls of said casing, and with the closure of said cartridge spaced from the closure of said casing, the bottom of said cartridge being spaced sufficiently from the bottom wall of said casing to provide an oil sump, filtering means disposed within said cartridge between said conduit and the perforated walls of said cartridge casing, means for introducing unclarified oil into and through the top of said shell head whereby said oil flows to the space between said closures and thence to the space between the inner wall of said hot water jacket and the outer wall of said cartridge casing and thence through the perforations of the vertical wall of said cartridge casing, through the filtering medium, through the perforations of said conduit, and thence centrally through the closure of said shell back to the oil system of said engine, whereby the unfiltered sludge from said oil system entering said inlet pipe of the closure of said shell is heated prior to passing through the filter, the unfilterable portion of said heated fluid passing to the sludge sump at the bottom of said shell and accumulating therein.

CHARLES BENSON DUSHANE, Jr.